United States Patent [19]

Accattino et al.

[11] Patent Number: 4,800,403

[45] Date of Patent: Jan. 24, 1989

[54] METHOD AND APPARATUS FOR RESTORING OPERATION OF INK JET PRINTING NOZZLES

[75] Inventors: Andrea Accattino, Romano; Aldo Jans, Banchette, both of Italy

[73] Assignee: Ing. C. Olivetti & C., S.p.A., Ivrea, Italy

[21] Appl. No.: 88,303

[22] Filed: Aug. 24, 1987

[30] Foreign Application Priority Data

Sep. 5, 1986 [JP] Japan ............................ 67691 A/86

[51] Int. Cl.[4] ............................................ G01D 15/16

[52] U.S. Cl. .................................. 346/140 R; 346/75

[58] Field of Search ........................... 346/140 PD, 75

[56] References Cited

U.S. PATENT DOCUMENTS

| | | | |
|---|---|---|---|
| 4,323,908 | 4/1982 | Lee et al. | 346/140 PD |
| 4,432,003 | 2/1984 | Barbero et al. | 346/140 |
| 4,466,005 | 8/1984 | Yoshimura | 346/140 PD |
| 4,485,386 | 11/1984 | Dagna et al. | 346/75 |
| 4,498,089 | 2/1985 | Scardovi | 346/140 |
| 4,502,054 | 2/1985 | Brescia et al. | 346/75 |
| 4,503,442 | 3/1985 | Barbero et al. | 346/140 |
| 4,503,443 | 3/1985 | Dagna et al. | 346/140 |
| 4,528,578 | 7/1985 | Balbo | 346/140 |
| 4,528,579 | 7/1985 | Brescia | 346/140 |
| 4,533,927 | 8/1985 | Iwagami et al. | 346/140 |
| 4,543,591 | 9/1985 | Terasawa | 346/140 |
| 4,546,361 | 10/1985 | Brescia et al. | 346/140 |
| 4,563,688 | 1/1986 | Braun | 346/140 |
| 4,571,600 | 2/1986 | Hara | 346/140 |
| 4,571,601 | 2/1986 | Teshima | 346/140 PD |
| 4,577,203 | 3/1986 | Kawamura | 346/140 PD |
| 4,600,931 | 7/1986 | Terasawa | 346/140 |
| 4,630,072 | 12/1986 | Scardovi et al. | 346/140 |
| 4,745,414 | 5/1988 | Okamura et al. | 346/140 |

OTHER PUBLICATIONS

European Patent Application 0 230 135 (front page).
European Patent Application 0 259 193.
European Search Report of European Application No. EP 259 193.

*Primary Examiner*—E. A. Goldberg
*Assistant Examiner*—Huân H. Tran
*Attorney, Agent, or Firm*—Banner, Birch, McKie & Beckett

[57] ABSTRACT

The apparatus makes it possible to restore operation of the nozzles of a print head by removing blockages and eliminating any bubbles of air or gases which may have formed in the ink jet printing elements of a dot printer. In the ink jet printing elements of the self-cancelling type in which the parasitic oscillations in the pressure of the ink are damped by the control circuit itself, blockages and air bubbles are eliminated by means of the control circuit which is caused to operate at a higher frequency than that used for the printing operation, under control of a microprocessor electronic selector switch and frequency generator. This is effected simultaneously with the application of a suction effect on the ink in the nozzles. The suction effect is produced by means of a suction pump connected to a resilient cup fitted in front of the nozzles in a parking position of the head beyond the platen. Shortly before the cup is withdrawn from the nozzles, the depression is nullified by opening a vent to ensure that the suction does not cause the ink to escape. A rubber disc adjacent the platen roller is provided for cleaning the printing elements, which wipe across the edge of the disc as the head moves back in front of the platen.

8 Claims, 3 Drawing Sheets

METHOD AND APPARATUS FOR RESTORING OPERATION OF INK JET PRINTING NOZZLES

BACKGROUND OF THE INVENTION

The present invention relates to an apparatus and a process for restoring operation of the nozzles of an ink jet print head.

As is known, the nozzles of an ink jet print head are subject to disadvantages which cause a deterioration in and/or interrupt operation thereof. The main causes of malfunctioning are as follows:

(a) blockage of the nozzles due to the ink drying out;

(b) the presence of air bubbles in the nozzles or in the vicinity thereof in the conduit of the printing element; the bubbles alter the hydraulic characteristics of the conduit with a consequential impairment of the level of efficiency of the printing element;

(c) retention of residues of liquid ink within the nozzles on the front surface of the printing elements; such residues interfere with the ink meniscus in the nozzle and cause expulsion of the drops of ink to be irregular.

Various methods for restoring optimum conditions of operation of the ink jet printing elements have been proposed, mainly directed at eliminating air bubbles from the nozzles. European patent application EP-A No. 45832 describes a method which provides for using two separate frequency generators, one for generating the frequency of the pulses for the printing operation and another for generating a higher frequency for eliminating the bubbles. Since that method excludes the use of a suction effect on the ink combined with high-frequency excitation of the head, it is ineffective in some circumstances, especially when the bubbles strongly cling to the walls of the conduits at irregularities in the internal surface of the conduits. Moreover that method uses a highly complicated and expensive circuit.

SUMMARY OF THE INVENTION

The object of the present invention is to provide a simple and inexpensive apparatus and method for restoring operation of the printing elements of an ink jet head.

Another object of the present invention is to provide an apparatus for restoring the operation of the nozzles of an ink jet print head wherein a suction device is adapted to be selectively connected to the head to apply a predetermined depression to the nozzles, to suck ink from the nozzles, and a control circuit applies pulses at a second frequency higher than the printing pulse frequency to the head during successive periods of time during the application of the depression.

The invention will be more clearly apparent from the following description of the preferred embodiment of the apparatus which is given by way of non-limiting examples with references to the accompanying drawings.

DETAILED DESCRIPTION OF THE PREFERRED EMBODIMENTS

Figure 1:
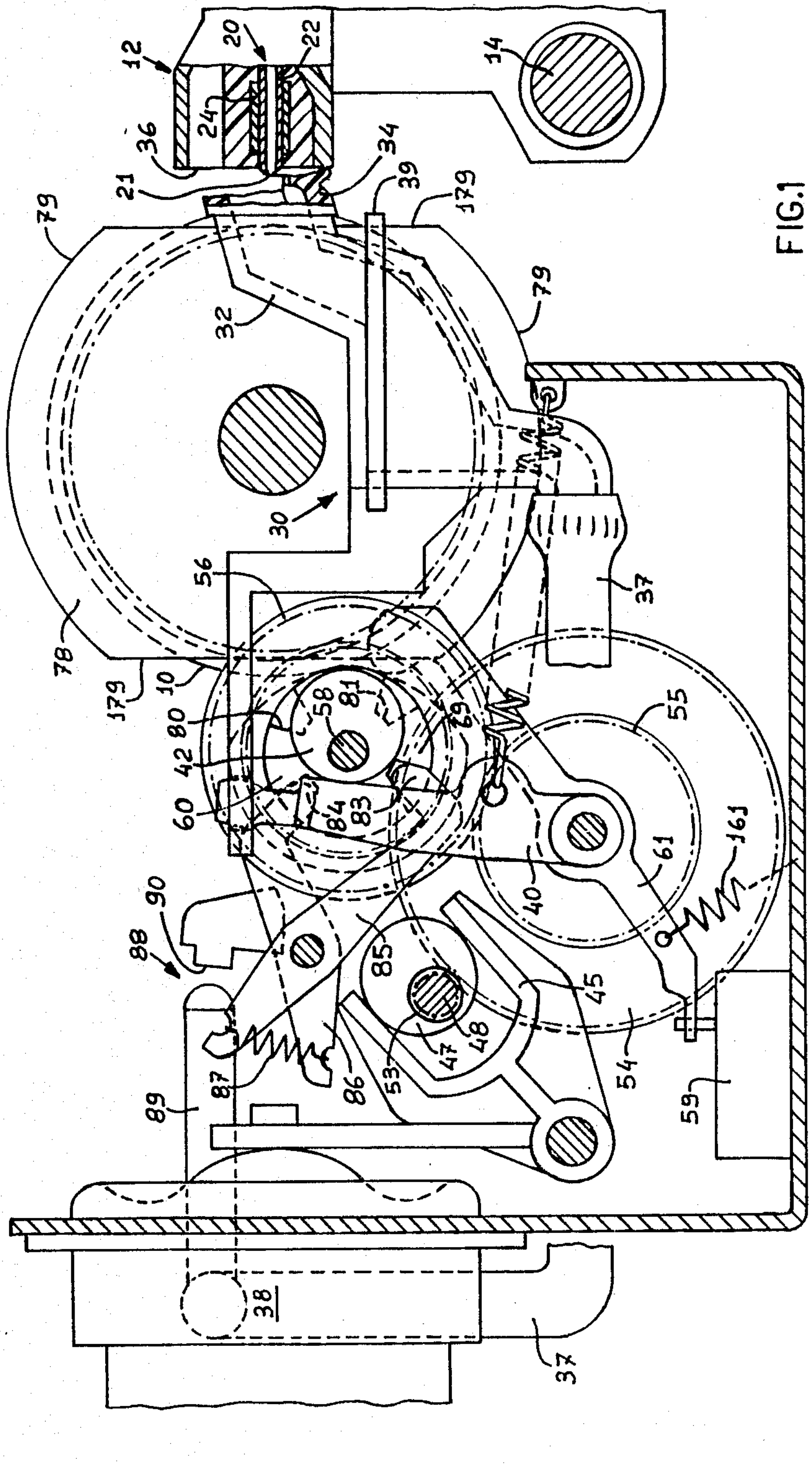
FIG. 1 is a side view of the apparatus for sucking and cleaning the nozzles of an ink jet print head.
Figure 2:
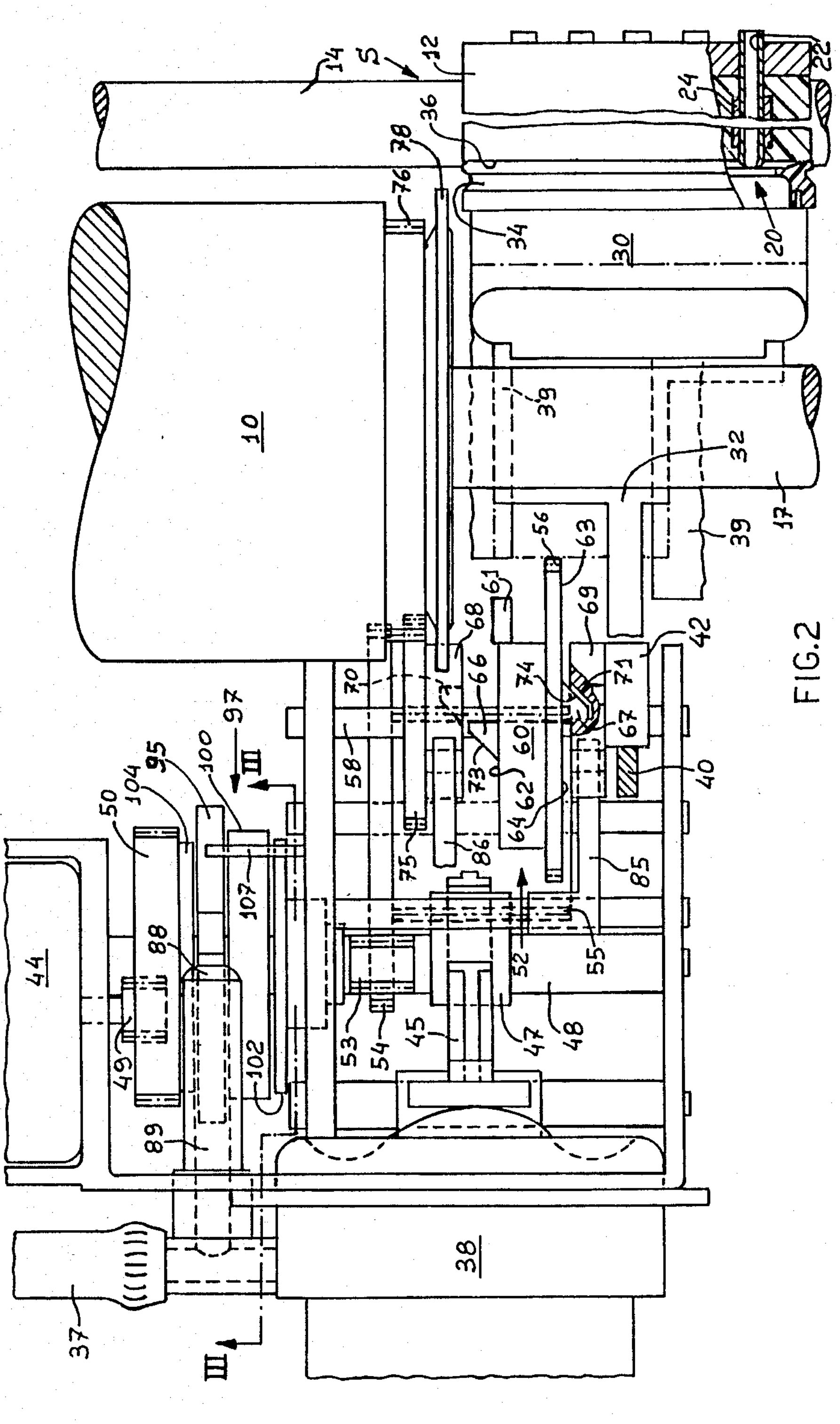
FIG. 2 is a plan view of the apparatus shown in FIG. 1.

Referring to FIGS. 1 and 2, the apparatus for sucking and cleaning the nozzles of a print head may be mounted on a printer of which FIGS. 1 and 2 show a platen roller 10 and a print head 12 movable to and fro on guides 14 which are parallel to the platen roller 10. The roller 10 is mounted on a shaft 17 which is rotatable on the structure of the printer. The head 12 comprises one or more printing elements 20 of known type, for example the type described in our published European patent application EP-A No. 0230135.

Figure 5:
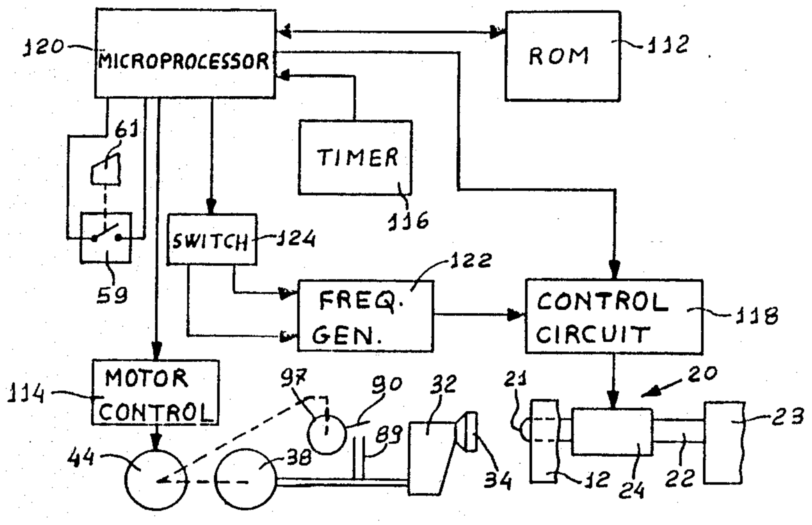
FIG. 5 is a block circuit diagram of a logic circuit for controlling the apparatus of FIG. 1.

Each element 20 comprises a tube 22 connected to a container for the ink, as indicated diagrammatically at 23 in FIG. 5 and provided with a piezoelectric transducer 24 which is excited by an electrical signal to expel the drops of ink through a nozzle 21 disposed at one end of the tube 22. The electrical signal for excitation of the transducer 24 is generated by a control circuit which is diagrammatically indicated at 118 in FIG. 5, preferably of the type described in our published European patent application EP-A No. 0 208 484. The control circuit can be activated, as will be described hereinafter, at a frequency which is suitable for the printing operation, for example 5 to 10 KHz, and at a ultrasonic frequency, for example 30 to 50 KHz, for the operations of purging the nozzles. In order to keep the printing elements 20 efficient, it is necessary not only to expel the bubbles from the tubes but also to keep the front surfaces of the tubes clean. For that purpose, in order rapidly and completely to expel the bubbles from within the tubes 22, high-frequency excitation of the printing elements 20 is combined with a strong suction effect through the nozzles 21 in order also to suck away the bubbles which are present, together with the ink, as the bubbles are removed from the walls of the tube. Furthermore, to keep the front surface of the tubes 22 and the heads 10 cleaned, a resilient disc 78 which will be described hereinafter is used.

Each time that the printing operations are interrupted for more than a given period, for example 3 seconds, the head 12 is moved into a parking position S (see also FIG. 2) which is located to the left of the platen roller 10, beyond the printing region. In the position S the head 12 is disposed in front of a device 30 for applying a suction effect to the ink.

The suction device 30 comprises a container 32 for collecting the ink which is sucked away and a rubber cup 34 which is mounted on the container 32 and which can be pressed against a face 36 at the front of the head 12. The container 32 is connected to a suction pump 38 by way of a suction conduit 37 and is movable on guides 39 perpendicularly to the direction of movement of the head 12 from the position shown in dash-dotted lines in FIG. 2 to the position shown in solid lines, against the head. Movement of the container 32 is produced by means of a lever 40 engaged with a cam 42 rotated by a bi-directional electric motor 44 controlled by the logic circuit shown in FIG. 5, as will be described hereinafter.

The pump 38 is actuated by a lever 45 engaged with a cam 47 mounted on a driveshaft 48. The shaft 48 is rotated by the motor 44 by means of gears 49 and 50 and transmits the rotary movement to a clutch 52 by way of the toothed wheels 53, 54, 55 and 56. The clutch is mounted on a shaft 58 which is parallel to the shaft 48 and is of the type having double face tooth formations, being controlled by the direction of rotation of the toothed wheel 56. Thus the toothed wheel 56 is mounted on a cylinder 60 which is slidable axially on the shaft 58. The cylinder 60 is mounted eccentrically on the shaft 58 for cyclically controlling a microswitch 59 (FIG. 1) by means of a lever 61.

Projecting from two opposite faces 62 and 64 (see FIG. 2) of the cylinder 60 are teeth 66 and 67 respectively of a sawtooth configuration. Two wheels 68 and 69 are freely rotatably mounted on the shaft 58 on opposite sides of the cylinder 60, each thereof having recesses 70 and 71 capable of receiving the corresponding teeth 66 and 67.

Since the backs 73 and 74 of the teeth 66 and 67 are mutually inclined in opposite directions, when the toothed wheel 56 rotates for example in the clockwise direction (FIG. 1), the cylinder 60 is moved away from the wheel 69 (FIG. 2) due to the action of the back 74 of the tooth 67, to be coupled to the wheel 68. If however the toothed wheel 56 rotates in the anti-clockwise direction, the cylinder 60 is moved away from the wheel 68 to be coupled to the wheel 69, leaving the wheel 68 free.

In order to facilitate disengagement of the teeth 66 and 67 from the respective recesses 70 and 71, the wheels 68 and 69 have notches 80 and 81 (FIG. 1) into which the ends 83 and 84 of two levers 85 and 86 are respectively pressed by a spring 87. The notches 80 and 81 are of such a configuration that the lever 86 prevents rotary movement of the wheel 68 in the anticlockwise direction while the lever 85 prevents rotary movement of the wheel 69 in the clockwise direction.

The cam 42 for actuating the container 32 is rigidly connected to the wheel 69. The wheel 68 rotates a rubber disc 78 by way of two gears 75 and 76, the disc 78 being used to keep the front face 36 of the head 12 clean. The disc 78 is fixed to the gear 76 which is rotatable on the shaft 17 at one end of the platen roller 10. The disc 78 comprises two diametrally oppositely disposed circular lobes 79 with flexible edges and of small thickness. The lobes 79 project beyond the periphery of the roller 10 each over an arc of about 90°, so that when the disc 78 is rotated through 90° one of the two lobes 79 is disposed in front of the head 12. That lobe rubs against the front face 36 of the head 12 and the ends 21 of the tubes 20 to remove any traces of ink. The profiles of the two lobes are connected by straight segments 179 such as not to interfere with the head 12. Normally the disc 78 is oriented with the segments 179 disposed vertically in order not to interfere with the head during the return movements thereof.

At the moment of separation as between the cap 34 and the head 10, a certain amount of ink can escape from the nozzles 26 because of a momentary depression due to the elasticity of the cap 34. To prevent that, at the end of the suction phase the container 32 is connected to atmospheric pressure by way of a valve 88 (FIGS. 1 and 2).

Figure 3:
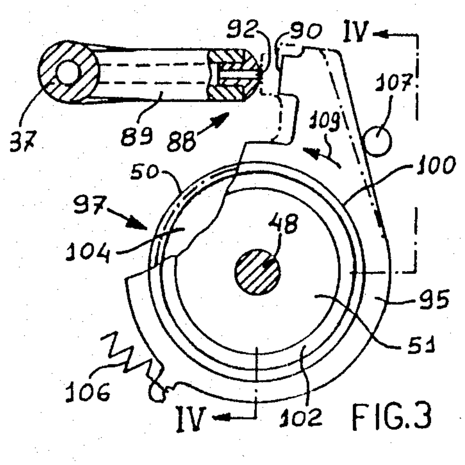
FIG. 3 is a view in section taken along line III—III in FIG. 2.
Figure 4:
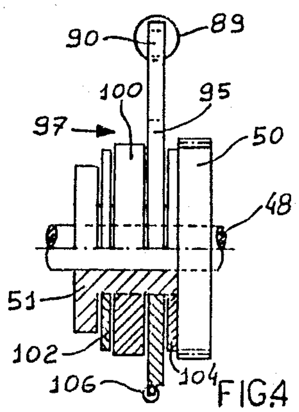
FIG. 4 is a view in section taken along line IV—IV in FIG. 3.

The valve 88 is applied to a branch 89 of the tube 37 and comprises a closure member 90 which is movable selectively to close off a hole 92 in the branch 89. The hole 92 communicates the interior of the chamber 32 with the atmosphere by way of the tube 37 (FIG. 1). The closure member 90 is carried in cantilever relationship by a disc 95 (FIGS. 3 and 4) of electrically conductive and diamagnetic material. The disc 95 forms the driven member of a clutch 97 of magnetic type which is mounted on the shaft 48. The clutch 97 further comprises a permanent magnet 100 of cylindrical shape and two discs 102 and 104 of ferromagnetic material which are coaxial with each other and with the disc 95. The magnet 100 and the disc 104 are mounted on opposite sides and at a small spacing with respect to the disc 95 while the disc 102 is adjacent to the side of the magnet 100 which is opposite with respect to the disc 95. The magnet 100 and the discs 102 and 104 are fixedly mounted on a hub member 51 which is fixed on the shaft 48 while the disc 95 is freely rotatable on the hub member 51. A return spring 106 is connected to the disc 95 in order normally to hold the closure member 90 spaced from the hole 92 against a stop 107 to permit the atmospheric pressure to be stabilised in the tube 37 and the container 32.

The flux lines of the magnetic field generated by the magnet 100 pass through the disc 95 and are closed by way of the discs 104 and 102. By rotating the magnet 100 and the disc 104 with respect to the disc 95 (see FIG. 3), an induced electrical current is generated in the disc 95 and, by reaction with respect to the magnetic field of the magnet 100, generates a torque which tends to cause the disc 58 also to rotate in the same direction. Therefore by rotating the disc 48 for example in the anticlockwise direction (FIG. 3) a torque is applied to the disc 95 in the direction indicated by the arrow 109. That torque overcoming the resistance of the spring 106, it moves the closure member 90 into a position against the hole 92, thereby closing it. Thus, whenever the shaft 48 is rotated in the anti-clockwise direction to actuate the pump 38, the valve 88 is automatically closed, isolating the tube 37 and thus also the container 32 from the atmosphere. As soon as the shaft 48 is stopped, at the end of the suction phase, the valve 97 opens again due to the force of the spring 106 so that at the time that the cap 34 is separated from the head 12, there is no ink suction effect. At the end of each suction operation, the disc 78 is rotated through 90° to move one of the lobes 79 in front of the head 12. During the return movement towards the printing region, the head 102 passes in front of one of the lobes 79 which removes the traces of ink from the front end 21 of the tubes 22. The ink which is collected on the disc 78 is absorbed by an absorbent pad (not shown) which rubs against the edges of the lobes 79.

The cycle of purging and cleaning the nozzles, which results from the combination of a strong suction effect and the simultaneous high-frequency excitation of the printing elements, is automatically performed on the basis of a predetermined program stored in an ROM 112 (FIG. 5) controlled by a microprocessor 120.

Figure 6:
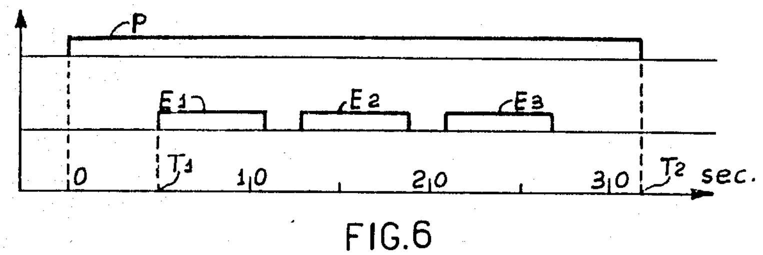
FIG. 6 is a timing diagram.

The mode of operation of the apparatus is as follows:

After a predetermined period of inactivity, for example 3 seconds, the head 12 is moved into the position S (FIG. 2). The motor 44 is actuated by its control circuit 114 (FIG. 5) under the control of the microprocessor 120 to rotate the toothed wheel 56 and the eccentric cylinder 60 which is fixed with respect thereto (FIG. 1) in the anti-clockwise direciton. The wheel 56 which initially was displaced towards the wheel 68 (FIG. 2) is urged towards the wheel 69 by the tooth 66 since the wheel 68 cannot rotate in the anti-clockwise direction, being prevented by the lever 86. The wheel 56 can thus rotate the wheel 69 by means of the tooth 67. The cam 42 which is fixed with respect to the wheel 69 moves the container 32, by way of the lever 40, from the dash-dotten line position shown in FIG. 2 to the solid-line position in such a way as to cause the cap 34 to bear against the front face 36 of the head 12. After a rotary movement through 180° in the anti-clockwise direction the cylinder 60 activates the microswitch 59 (FIG. 1) to stop the motor 44. The motor 44 is then caused to rotate in the clockwise direction by the microprocessor 120 so as to rotate the wheel 56 in the same direction. The wheel 56 is moved away from the wheel 69 by means of the inclined back 74 of the tooth 67. The rotary movement in the anti-clockwise direction of the shaft 48 activates the magnetic clutch 97 (see FIGS. 2 and 3), with consequential closure of the hole 92 by the closure member 90. The pump 38 which is activated by the motor 44 by means of the cam 47 and the lever 45 creates in the cap 34 a depression of about 300 mm of mercury with respect to atmospheric pressure. That depression causes a certain amount of ink to flow out of the nozzles 21, the ink carrying away any solid impurities or clogging material present in the tubes 22. After a time $T_1$ of around 5 seconds of just a suction effect, has been set by a timer 116, the microprocessor 120 activates the control circuit 118 (see FIG. 5) by means of three signals $E_1$, $E_2$, $E_3$ (FIG. 6), each of a duration of 6 seconds and spaced by about 2 seconds, at a repetition rate which is in the ultrasonic band, to expel the drops of ink.

The circuit 118 can operate without distinction at a frequency of between 1 and 40 KHz. The control circuit 118 is connected to a frequency generator 122 which is arranged to generate a first frequency of between 5 and 10 KHz which is used for the printing operation and a second frequency of around 30 KHz which is used to expel drops of ink during the suction cycle. The generator 122 is controlled by the microprocessor 120 by way of an electronic switch 124 for selectively generating one or other of the above-mentioned frequencies. At the end of the signal $E_3$ (FIG. 6), the suction effect is caused to continue for around a further 5 seconds up to the time $T_2$ set by the timer 116, in order to ensure that all the bubbles escape from the tubes 22. At the time $T_2$ the microcomputer 120 causes stoppage and reversal of the movement of the motor 44. As soon as the shaft 48 has stopped, the clutch 97 is automatically deactivated and the valve 88 opens due to the force of the spring 106. In that way the interior of the container 32 is brought to atmospheric pressure.

Reversal of the direction of rotation of the motor 44 causes rotary movement of the wheel 56 in the anti-clockwise direction (see FIG. 1), whereby it will engage with the wheel 69 in the above-indicated manner. By means of the lever 40, the cam 42 causes the container 32 to move away from the head 12, to the position shown in dash-dotted lines in FIG. 2. After a rotary movement of the wheel 56 through 180°, the cylinder 60 activates the microswitch 59 to stop the motor 44.

The microprocessor 120 then provides for a further reversal in the rotary movement of the motor 44 which causes the wheel 56 to rotate in the clockwise direction through 180° whereby the latter is urged by the tooth 67 into engagement with the wheel 68. The wheel 68, by way of the gears 75 and 76, causes the disc 78 to perform a rotary movement through 90° in order to bring one of the lobes 79 in front of the head 12. At the end of the purging operation, the head 12 is returned to an initial printing position (not shown in the drawings) and during that movement the head 12 passes in front of the disc 78, a lobe of which removes any ink residue from the front surfce 21 of the tubes 22.

We claim:

1. Apparatus for restoring the operation of at least a nozzle of an ink jet head, including a printing element carrying said nozzle, said element being permanently filled with ink and connected with an ink tank means, the apparatus comprising a suction device adapted to be selectively connected to said head to apply a predetermined depression to said head to draw ink through the nozzle, said suction device comprising a movable container for collecting the ink drawn from said nozzle and an elastic cap connected to said container and selectively covering said head, depression means for generating said depression within said container and said cap, said depression means comprising a vacuum pump connected to said cap through a drain conduit, valve means interposed in said drain conduit between said pump and said cap, and magnetic coupling means connected to said valve means and activated by said pump for selectively connecting said cap with the pump to apply said depression to the head and for connecting said cap to the atmosphere after the pump is deenergized and before the cap is removed from said head, whereby any additional suction effect caused by said elastic cap is prevented.

2. Apparatus according to claim 1, wherein said magnetic coupling means comprises first and second discs coaxially fixed on a drive shaft and a third disc interposed between the first and second discs and which is freely rotatable on the shaft, the third disc having a closure member capable of closing the valve.

3. Apparatus according to claim 2 wherein the first disc is a permanent magnet and in that the second and third discs are respectively of ferromagnetic and diamagnetic material whereby, upon rotary movement in a first direction of the drive shaft, the third disc is rotated in the same direction under the effect of the variation in the magnetic field linked through the third disc.

4. Apparatus according to claim 3, wherein said pump is rotated by said drive shaft, said valve means comprising an aperture communicating with said cap and the atmosphere and said closure member comprising a flat surface arranged to close said aperture, whereby whenever the drive shaft is rotated to actuate said pump, said third disc is simultaneously rotated in said first direction to push said surface against said aperture.

5. Apparatus according to claim 4, wherein said third disc is rotated in said first direction from a rest position in which the closure member is held at a spacing from said aperture by a resilient element to an operative position in which said surface closes said aperture for insulating said container from the atmosphere.

6. Apparatus according to claim 1, wherein said head is moved in a parking position located adjacent a printing plate, for a nozzle restoring operation, said apparatus comprising a rotatable resilient disc having a plurality of lobes, said disc being rotatably mounted on a platen shaft in a position intermediate between said parking position and said platen, said lobes having a circular edge with a diameter greater than the diameter of said platen, whereby said lobes are predisposed to wipe against a nozzle face of said head when said head is moved from said parking position to a printing position along said platen.

7. Apparatus according to claim 6, comprising a gear rotated by said drive shaft and axially movable along said shaft between a first and a second position depending on the direction of rotation of said shaft, said gear being provided on two opposite faces with face teeth capable of selectively coupling said gear to a first wheel to rotate said resilient disc when said shaft rotates in said first direction and to a second wheel including a cam member, rotatable for moving said cap against said head, when said shaft rotates in the opposite direction.

8. Apparatus according to claim 7, wherein the second wheel comprises a cam for moving the container and the first wheel comprises a gear arrangement capable of rotating the resilient disc.

* * * * *